United States Patent [19]

New

[11] Patent Number: 4,817,007

[45] Date of Patent: Mar. 28, 1989

[54] MACHINE TOOL CONTROL SYSTEMS

[75] Inventor: Nigel H. New, Harrow, England

[73] Assignee: AE PLC, Rugby, United Kingdom

[21] Appl. No.: 17,558

[22] PCT Filed: Jul. 22, 1987

[86] PCT No.: PCT/GB86/00434

§ 371 Date: Feb. 24, 1987

§ 102(e) Date: Feb. 24, 1987

[87] PCT Pub. No.: WO87/00646

PCT Pub. Date: Jan. 29, 1987

[30] Foreign Application Priority Data

Jul. 23, 1985 [GB] United Kingdom ............ 8518609

[51] Int. Cl.$^4$ ............................................ G05B 13/00
[52] U.S. Cl. ............................ 364/474.01; 318/571; 318/696; 82/118
[58] Field of Search ............... 364/474, 475, 191, 174, 364/167; 318/569, 604, 571, 696; 82/2 B

[56] References Cited

U.S. PATENT DOCUMENTS

| | | | |
|---|---|---|---|
| 4,031,368 | 6/1977 | Colding et al. | 364/475 |
| 4,038,890 | 8/1977 | Winget | 364/474 |
| 4,237,408 | 12/1980 | Frecka | 364/475 |
| 4,401,930 | 8/1983 | Kato et al. | 364/474 |
| 4,468,741 | 8/1984 | Simonton | 364/474 |
| 4,694,401 | 9/1987 | Higuchi | 364/475 |

Primary Examiner—Jerry Smith
Assistant Examiner—Allen MacDonald
Attorney, Agent, or Firm—Leydig, Voit & Mayer

[57] ABSTRACT

A machine tool has a workpiece which is rotated by a motor. The tool is moved by a tool drive to machine a required surface profile on the workpiece and is also indexed on a carriage. The stepping signals for the workpiece motor are produced by a control system and, for each workpiece step, the control system also produces from a data store, a signal which moves the tool to the required tool position for machining the workpiece profile at the angular position corresponding to the stepped position of the workpiece motor. After each revolution of the workpiece motor, the carriage is indexed. Thus, the control system also controls the rotation of the workpiece and so no feedback of the workpiece position is required. This means that, during the machining cycle, the control system is involved solely with the supply of data from the store and does not conduct any calculation. As a result of this, the machining speed can be greatly increased and the computational power of the control unit may be significantly reduced. This is particularly useful in the production of bearings with complex interior shapes.

9 Claims, 2 Drawing Sheets

MACHINE TOOL CONTROL SYSTEMS

BACKGROUND OF THE INVENTION

1. Field of the Invention

The invention relates to machine tool control systems.

2. Description of the Related Art

In recent years, many forms of machine tool including computer numerical control (CNC) systems have been developed. In such machine tools, a workpiece is rotated and a tool moved in two mutually perpendicular directions by stepping motors controlled to produce a required workpiece profile from data defining the required profile and held in digital form in a control system. In such CNC machine tools, however, the motor which rotates the workpiece is not controlled by the control unit; rather it is rotated independently and a workpiece position transducer is used to feed to the control system a signal corresponding to the angular position of the workpiece.

It is a disadvantage of such CNC systems that they have to perform a feedback function to account for variations in the speed of workpiece drive. This has the disadvantage that valuable data storage space and computing time are taken in performing this function, so reducing the overall machining speed.

SUMMARY OF THE INVENTION

According to a first aspect of the invention, there is provided a machine tool comprising an electric motor for rotating a workpiece from a datum angulor position, a tool for machining said rotating workpiece, a tool drive connected to said tool for moving said tool to produce a required surface profile on said rotating workpiece, a control system, a store included in the control system, connected to the tool drive and containing data defining said required surface profile, an output device included in the control system and connected to the workpiece motor, the tool drive and the store to output and to the workpiece motor a succession of step signals to rotate the workpiece motor and the workpiece, and, for each step signal, to output to the tool drive from the stored data, a tool drive signal corresponding to a required tool position to machine said required surface profile, at the angular position of the workpiece holder determined by the number of step signals outputted since a datum angular position of the workpiece motor.

Thus, by the workpiece motor from step signals produced from the tool system, the control system is not required to deal with feedback signals from the workpiece motor.

The following is a more detailed description of one embodiment of the invention, by way of example, reference being made to the accompanying drawings in which:

DESCRIPTION OF THE PREFERRED EMBODIMENTS

Figure 1:
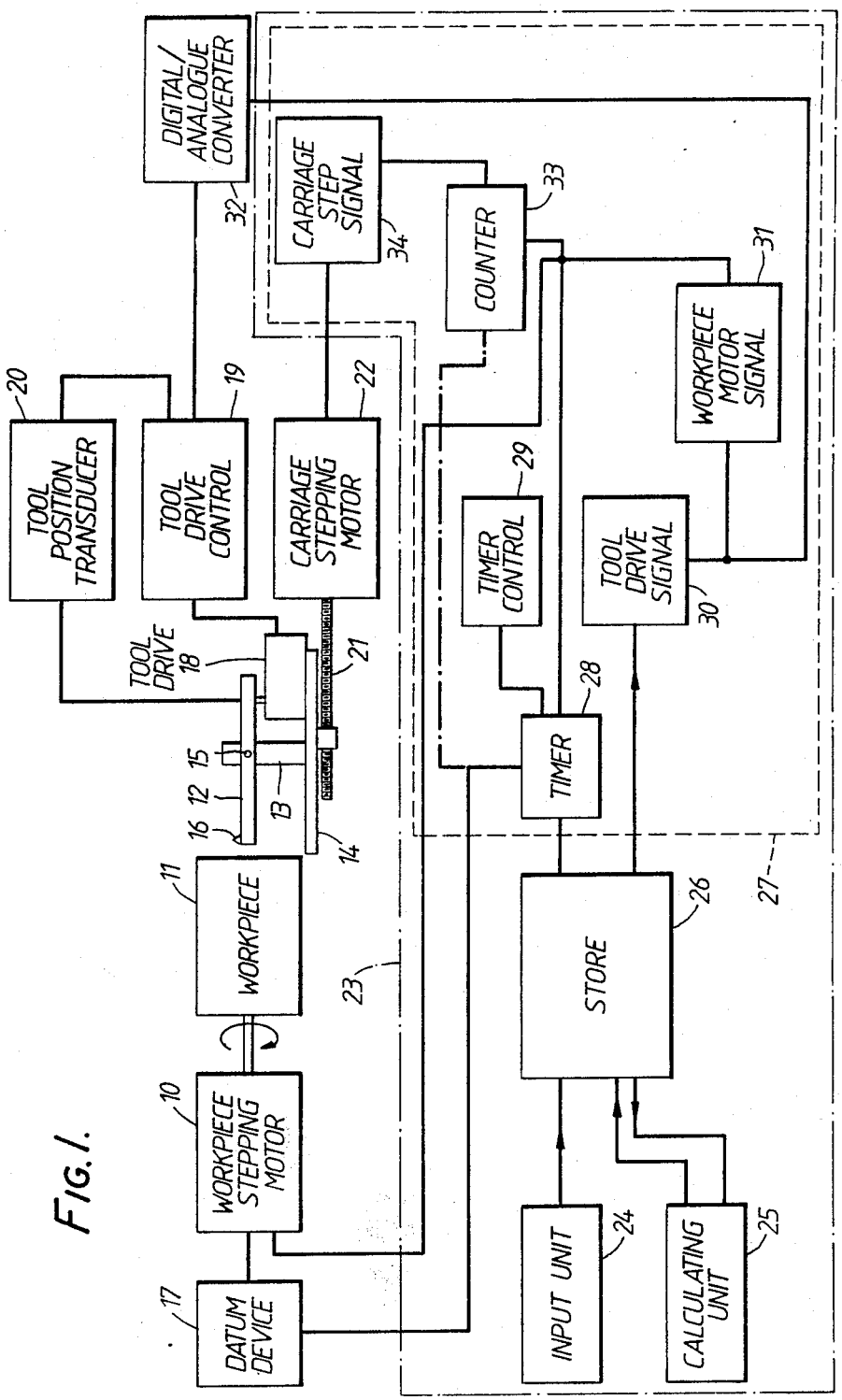
FIG. 1 is a schematic block diagram of a machine tool and of a control system for controlling the machine tool.

Referring first to FIG. 1, the machine tool comprises a workpiece stepping motor 10 which rotates a workpiece 11 (which will be described in more detail below). The workpiece motor 10 may drive the workpiece 11 directly, as shown, or may drive it through appropriate gearing or belting. A datum device 17 is connected to the workpiece motor 10 and produces a datum signal when the workpiece motor passes a predetermined angular position.

A tool holder 12 is mounted for pivotal movement on a post 13 which is mounted on a carriage 14. The pivot axis 15 of the tool holder is normal to the axis of rotation of the workpiece 11.

A tool 16 is mounted at one end of the tool holder 12 and the other end of the tool holder 12 is connected to a tool drive 18, which is also mounted on the carriage 14 and is for moving the tool holder 12 about the pivot.

The tool drive 18 is under the control of a tool drive control system 19 which receives feedback signals from a tool position transducer 20. The operation of these parts will be described in more detail below.

The carriage 14 is mounted for movement on a lead screw 21 in a direction parallel to the axis of the workpiece 11. For effecting this movement, a carriage stepping motor 22 is provided, whose operation will also be described in more detail below.

The operation of the machine tool is controlled by a control system 23 which includes an input unit 24, a calculating unit 25, a store 26 and an output device 27. The output devices includes a timer 28 which receives signals from the datum device 17 and is under the control of a timer control 29. An output of the timer 28 is connected to the store 26. An output of the store 26 is connected to a tool drive signal device 30 whose output is connected to a workpiece motor signal device 31 and to a digital/analogue converter 32 whose output is, in turn, connected to the tool drive control system 19. The workpiece motor signal device 31 has a first output which is connected to the timer 28, a second output which is connected to the workpiece stepping motor 10 and a third output which is connected to a counter 33. The counter 33 has one output which is connected to a carriage step signal device 34 whose output is, in turn, connected to the carriage stepping motor 22, and has an optional input from the datum device 17 (for a purpose to be described in more detail below).

The control system 23 may be implemented by an conventional micro-computer provided with sufficient storage capacity and suitable programmed.

In use, the machine tool is for machining at high speed workpieces which are required to have complex surface profiles. Some examples of profiles are shown in FIGS. 2A–2E and 3A–3D in the form of interior surface profiles of bearings.

Figure 2A:
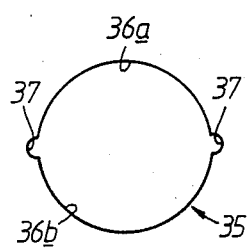
FIGS. 2A, 2B, 2C, 2D and 2E are views of five interior cross-sectional profiles of bearings when can be manufactured using the machine tool of FIG. 1, and FIGS. 3A, 3B, 3C and 3D are views of four interior axial profiles of bearings which can be manufactured using the machine tool of FIG. 1.
Figure 2B:
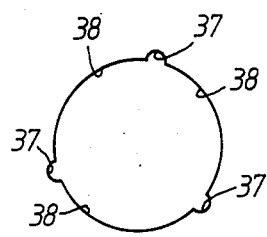
Figure 2C:
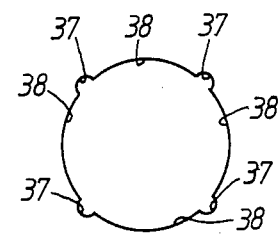
Figure 2D:
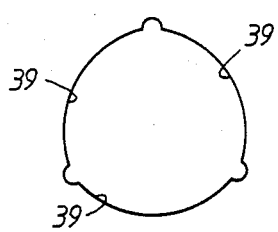
Figure 2E:
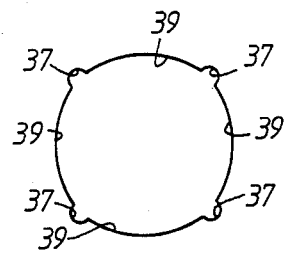

FIGS. 2A, 2B, 2C, 2D and 2E show five cross-sectional profiles of bearings. In FIG. 2A, the bearing 35 has a profile formed by two part-circular sections 36a, 36b, where the axis of each circular section lies on the other side of the axis of the bearing to section itself. The ends of the sections are interconnected by channels 37. In FIGS. 2B and 2C, three or four circular sections 38, respectively, are provided, with the centres of the circular sections 38 lying on the axis of the bearing. The ends of the sections are interconnected by channels 37. In FIGS. 2D and 2E, again three and four circular sections 39, respectively, are provided, but in these embodiments, each circular section 39 has an axis which is offset from the xis of the bore and once again the ends of the sections 39 are interconnected by channels 37.

Figure 3A:
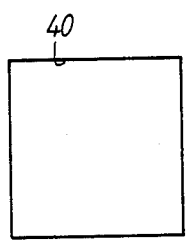
Figure 3B:
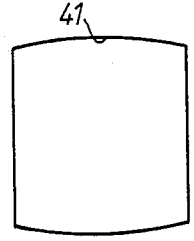
Figure 3C:
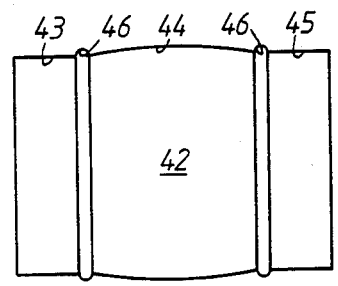

FIGS. 3A, 3B, 3C and 3D show various axial profiles of bearings. In FIG. 3A, the bearing 40 has sides which are parallel to one another and parallel to the axis of the bearing 40. In FIG. 3B, the sides of the bearing 41 are barrelled about the axis of the bearing. In FIG. 3C, the axial profile of the bearing 42 is formed in three successive sections 43, 44, 45. The first and last sections 43, 45 have parallel sides while the central section 44 is barrelled. The sections are interconnected by side rails 46 in the form of circumferential portions of increased diameter.

Figure 3D:
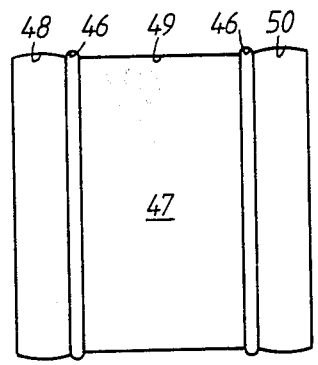

In FIG. 3D the bearing 47 has an axial profile formed in three sections 48, 49, 50 interconnected by side rails 46. The first and last sections 48, 50 are barrelled, while the central section 49 has the same cross-section as the bearing of FIG. 2C.

All the cross-sectional profiles of FIGS. 2A, B, C, D and E can be defined by algorithms in which the substitution of values of the variables (usually an angle and a radius) allows the profile to be defined. The profile in an axial direction, such as those of FIGS. 3A, B, C and D, can be similarly defined by the use of differing algorithms at set axial distances along the bearing.

In use of the machine tool described above with reference to FIG. 1, the input unit 24 is used to insert into the store 26 the algorithms for various required cross-sections of bearings (which may be cross-sections other than those described above with reference to FIGS. 2A to 2E) and various axial profiles (which, again, may be profiles other than the profiles described with reference to FIGS. 3A to 3D). When a particular cross-sectional axial profile is to be produced, the input unit 24 is used to select the required profile from those stored in the store 26. The required parameters of the chosen profile are then entered using the input unit 24 and the calculating unit 25 calculates from these parameters and the algorithms data which defines the profile and which is stored in the store 26.

The intervals at which the data is produced are chosen as follows. Since the workpiece is rotated by a stepping motor 10 and since the carriage is also moved by a stepping motor 22, the number of steps required for a revolution of each motor is fixed. For example, in a common commercially used stepping motor, there may be 480 steps per revolution. Accordingly, in a circumferential direction, a profile data is produced at intervals of 45 minutes of angle.

The interval in the axial direction is determined not solely by the steps of the carriage stepping motor 22 but also by the pitch of the lead screw 21, and the intervals at which the axial data are defined are chosen to be the amount of axial movement of the tool 16 produced by one step of the carriage stepping motor (although it will be appreciated that two or three or more steps may be used to provide a required movement).

Thus, after the calculations have ben completed, the store 26 contains data defining the complete cross-sectional and axial profile of the required bearing at the required intervals.

Next, a blank bearing is mounted on a workpiece 11 on the output of the workpiece stepping motor 10. The tool 16 is then moved to a datum axial position relative to the workpiece 11 and operation of the control system 23 commences, as follows.

First, the workpiece stepping motor 10 is stepped unit it reaches a predetermined angular position. At this position, the datum device 17 produces a datum signal which is fed to the timer 28 and thence to the store 26. On receipt of this signal, the store 26 produces data which corresponds to the first required tool position and which is fed to the tool drive signal device 30 to be converted into a signal corresponding to the required tool drive signal necessary to move the tool 16 to the position to machine said required profile. The tool drive signal device 30 produces this signal as a digital signal which is fed to a digital-to-analogue converter 51 before being applied to the tool drive control system 19 and thence to the tool drive 18. The tool position transducer 20 provides a feedback signal to the tool drive controls system 19 which is used to provide closed loop control of the tool drive 18.

The production of the tool drive signal also causes the workpiece motor signal device 31 to produce a step signal which is fed to the workpiece stepping motor 10 to step the motor. This signal is also fed to the timer 28 to trigger the production of the next piece of profile data from the store 26, which in turn produces the next tool drive signal and the next workpiece motor step signal.

Since the operation of the control system depends simply on the feeding of data from the store 26, and does not involve any calculation, the rate of feed of the data can be high, so producing high rotational speeds of the workpiece stepping motor 10 and correspondingly high machining rates. Plainly, however, there will be a certain lag inherent in the tool drive 18 and the tool holder 12 movement, due to their inertia (although this can be minimised by reducing the weight and inertia of these parts) and this is allowed for by the provision of the timer 28, which, on receipt of the workpiece motor step signal, delays the production of the next tool drive signal for a required time. In order to allow different machining rates and different tool holders and tools, the timer control 29 is provided to allow this delay to be varied as required.

The workpiece motor step signal is also fed to the counter 33 which increments each time a workpiece motor step signal is received. When a total of the counter reaches the number of steps required to produce a revolution of the workpiece stepping motor 10, the counter 33 actuates the carriage step signal device 34 which produces a step signal which steps the carriage stepping motor 22 to move the tool 16 axially by a step. It will be appreciated, however, that the counter need not count one revolution, it could count two or three or four or more revolutions before causing the carriage stepping motor 22 to step, with the data in the store being adjusted accordingly. Likewise, the complete data could be repeated an incremental number of times.

In order to avoid any inaccuracy in the operation of the counter 33, the datum device 17 may be arranged to produce a datum signal on each revolution of the workpiece stepping motor 10, with its signal being fed to the counter 33. If the counter 33 completes the count of the number of step required for a revolution of the workpiece stepping motor 10 before or after the arraival of the datum signal, and adjustment is made to bring the operation of the counter 33 back into phase with the production of the datum signal.

It will be appreciated that the machine tool described above with reference to the drawings could be arranged to machine other than the internal profiles of bearings. For example, the machine tool could be arranged to machine the external profiles of pistons for internal combustion engines, such as pistons provided with profiles of the kind described in U.K. Patent Specification No. 2104188. In this case, the stored data may not be produced by algorithmic calculations but may be produced by entering data at change points and then interpolating between the change points. Alternatively, thrust bearings may be produced where the tool is used to profile an initially flat surface so that the tool drive moves the tool in directions parallel to the axis of rotation of the workpiece while the carriage stepping motor moves the tool in a radial direction relative to this axis of rotation.

It will also be appreciated that, even where the profiles can be defined by algorithms, the control system may be connected directly to a computer design system so that new designs of bearing (or of any other workpieces) can be passed directly to the control system and machined directly.

It will be further appreciated that the machine tool may be incorporated in a system which removes finished workpieces and replaces them with fresh workpieces under control of the control system.

The motors 10, 22 need not be stepping motors, they could be D.C. servo motors.

I claim

1. A machine tool comprising:
an electric motor for rotating a workpiece from a datum angular position,
a tool for machining said rotating workpiece,
a tool drive connected to said tool for moving said tool to produce a required surface profile on said rotating workpiece,
a control system.
a store containing data defining said required surface profile,
an output device connected to the workpiece motor the tool drive and the store for outputting to the workpiece motor a succession of step signals to rotate the workpiece motor and the workpiece, and, for each step signal, to output to the tool drive from the stored data, a tool drive signal corresponding to a required tool position to machine said required surface profile, at the angular position of the workpiece holder determined by the output deice from the number of step signals outputted since said datum angular position of the workpiece motor.

2. A machine tool according to claim 1, wherein the tool and the tool drive are mounted on a carriage, a motor being connected to the carriage for moving the carriage in a direction lying in a plane normal to the plane of movement of the tool by the tool drive, to traverse the tool over the workpiece, the control system being connected to said carriage motor and for producing a step signal which is fed to the carriage motor when the work piece motor has performed a complete revolution, and the data held in said store being data defining the workpiece surface profile at successive carriage positions.

3. A machine tool according to claim 2, wherein the control system contains a counter, the counter being connected to the output device and being incremented when the output device produces a step signal for the workpiece motor and the carriage step signal being produced by the control system when sufficient workpiece motor step signals to rotate the workpiece motor by a revolution.

4. A machine tool according to claim 1 wherein a datum device is connected to the workpiece motor for producing a signal when the workpiece motor passes said datum angular position, the datum signal triggering production of the workpiece motor step signals and the tool drive signals.

5. A machine tool according to claim 4, wherein a datum signal is produced on each revolution of the workpiece motor, the production of the datum signals being compared, in the control system, with the production of the carriage step signal and a correction produced by the control system being applied by the control system to the carriage step signal when the datum signal and the carriage step signal are out of the phase, to bring said signals into coincidence.

6. A machine tool according to claim 1 wherein each workpiece step signal triggers the production of the next succeeding work and tool drive signals, there being provided a timer, which operates when a workpiece step signal is produced, for initiating, after a predetermined time, the production of the next succeeding workpiece and tool drive signals.

7. A machine tool according to claim 6 wherein the timer comprises means for producing a predetermined time that is variable, to accommodate various tool drives and to vary the speed of rotation of the workpiece.

8. A machine tool according to claim 1 wherein the control system includes an input unit connected to the store and a calculation unit connected to the store, the store including means for storing algorithms of workpiece surface profiles, the input unit including means for inputting required values of the algorithmic variables and the calculating unit comprising means for producing the corresponding surface profile data from said values and the algorithm, before commencement of machine.

9. A machine tool according to claim 8 wherein the input unit the calculation unit and the store are embodied in a single computational unit following different branches of a program.

* * * * *